Sept. 9, 1941.   N. M. HANSEN   2,255,546
MOLD FOR CASTING GRINDING BODIES
Filed July 11, 1939   3 Sheets-Sheet 1
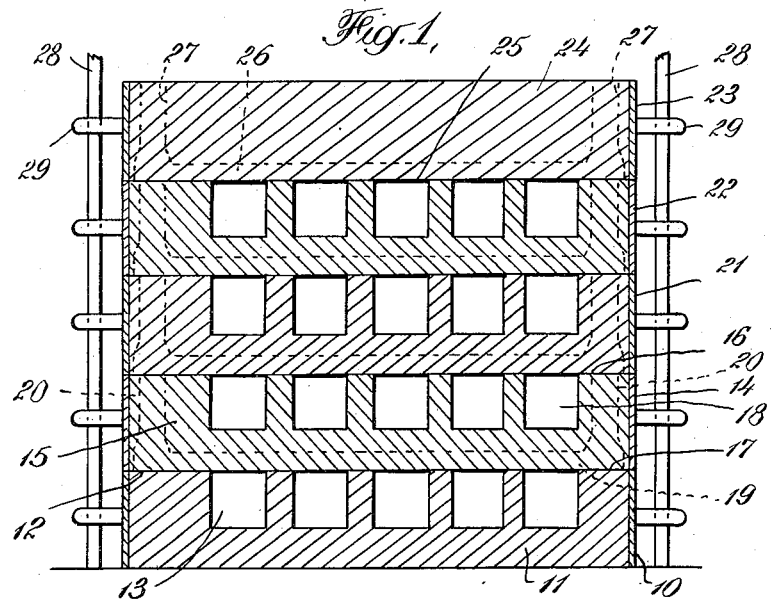
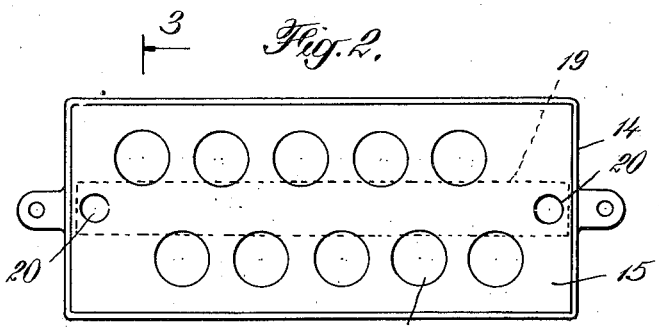
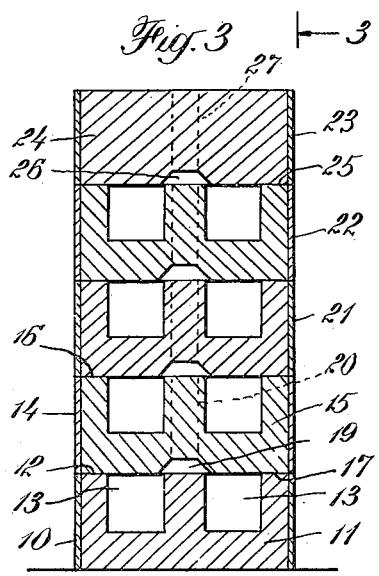
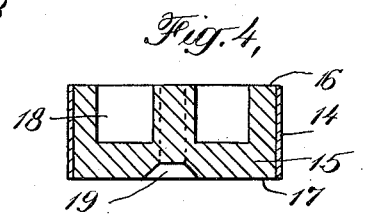
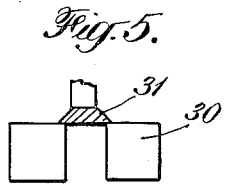
INVENTOR
Niels Marius Hansen
BY
Pennie Davis Marvin Edmonds
ATTORNEYS Sept. 9, 1941.   N. M. HANSEN   2,255,546
MOLD FOR CASTING GRINDING BODIES
Filed July 11, 1939   3 Sheets-Sheet 2
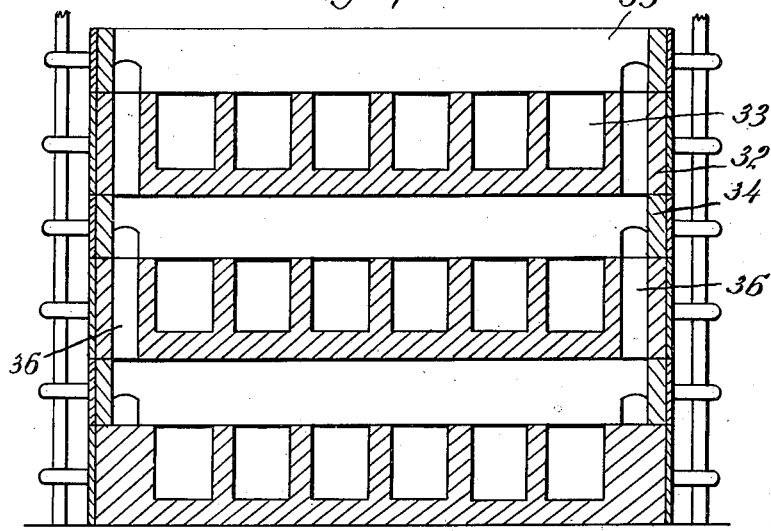
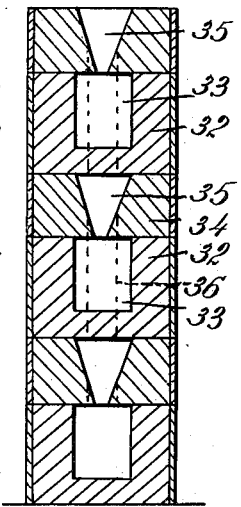
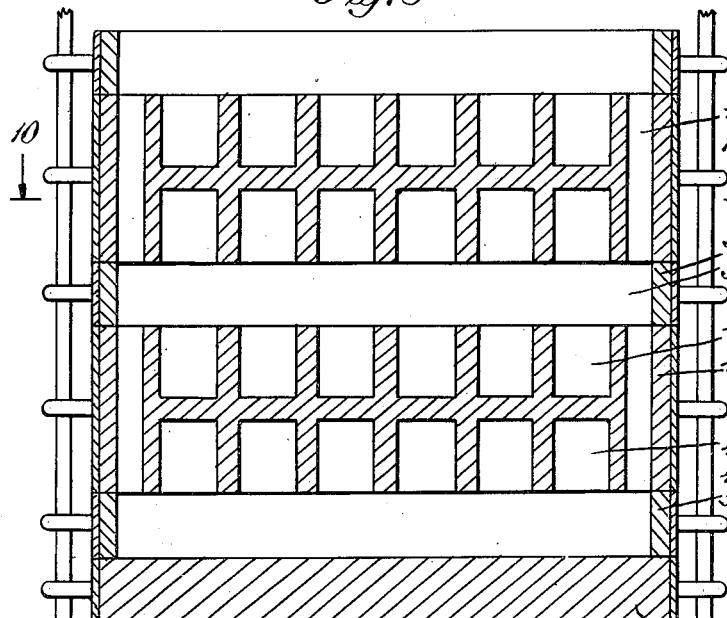
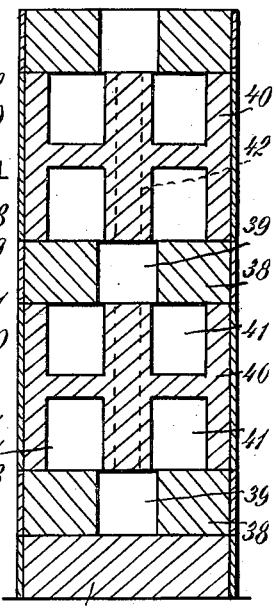
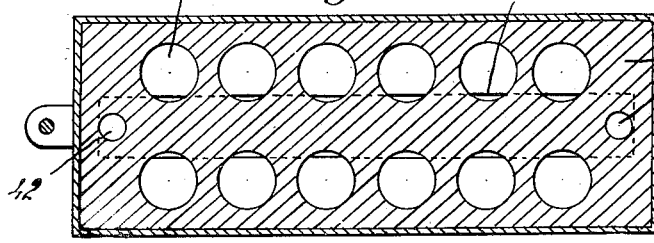

Sept. 9, 1941.  N. M. HANSEN  2,255,546
MOLD FOR CASTING GRINDING BODIES
Filed July 11, 1939  3 Sheets-Sheet 3
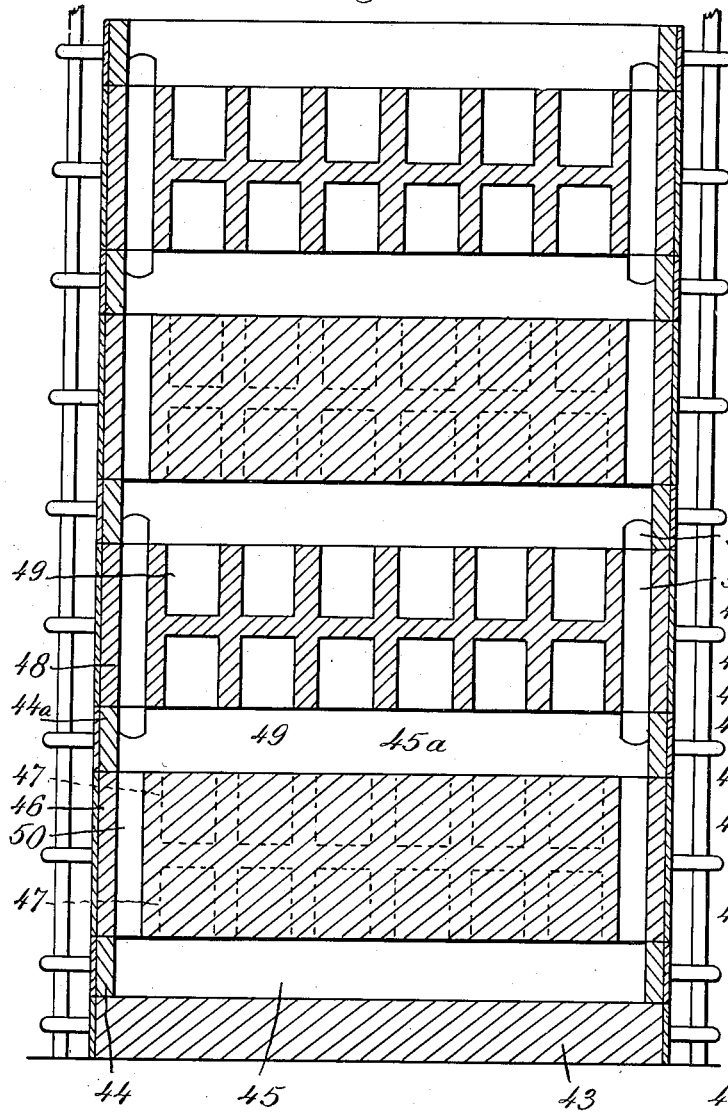
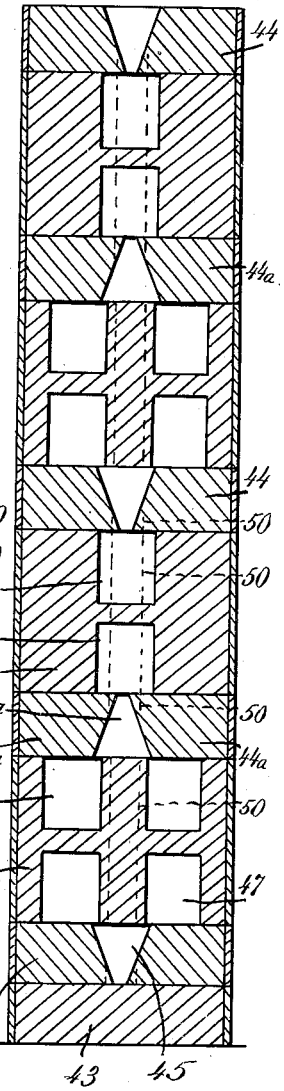

Patented Sept. 9, 1941

2,255,546

UNITED STATES PATENT OFFICE 2,255,546

MOLD FOR CASTING GRINDING BODIES

Niels Marius Hansen, Ordrup, near Copenhagen, Denmark, assignor to F. L. Smidth & Co., New York, N. Y., a corporation of New Jersey Application July 11, 1939, Serial No. 283,892
In Great Britain July 11, 1938

13 Claims.  (Cl. 22—130)

This invention relates to the production of grinding bodies employed in mills and is concerned more particularly with a novel apparatus by which such grinding bodies may be made rapidly and in a condition which permits them to operate at high efficiency without first undergoing considerable wear.

Heretofore, grinding bodies used in tube and similar mills as, for example, in the fine grinding of cement raw materials, were almost exclusively spherical in shape, but more recently it has been found that cylindrical bodies having a length equal to from one to one and a half times their diameter grind better and such bodies have come into extensive use. In order to obtain the greatest grinding efficiency, it is necessary that the grinding bodies should be perfect in shape regardless of whether their form is cylindrical or otherwise and in particular, burrs or ridges on the bodies reduce the grinding efficiency, since such projections keep the bodies from coming into close contact with one another and thus prevent the bodies from acting on grains of small size. Accordingly, until any burrs which are present on the grinding bodies are removed and, in the case of cylindrical bodies, the end surfaces are smooth and flat, the bodies are not highly effective in performing their grinding function and the efficiency of the grinding apparatus is correspondingly reduced.

Grinding bodies must be made in large quantities at a time for economic reasons and at present, two different methods of making bodies of the cylindrical type are in use. According to the first method, the bodies are cut from hard rolled steel bars of appropriate diameter. This method of manufacture is not satisfactory, however, because in the cutting of the bars, the material is always compressed and distorted, so that the bodies thus produced are not exactly cylindrical.

According to the second method, bars are cast in two-part molds, each bar being formed with transverse grooves separated a distance equal to the length of the bodies which it is desired to produce, and the bodies are then formed by breaking the bars at the grooves. This method is likewise unsatisfactory because the surfaces of the bodies are likely to be uneven because the surfaces of fracture extending substantially across the entire end of each body are irregular and, also, because the presence of the grooves is likely to interfere with the casting operation and result in cold shut. In such a casting operation, the cylindrical pattern for each bar is divided along an axial plane coincident with the meeting surfaces of the two parts of the mold, and, if the mold sections are not assembled in exact alignment before the pouring is begun, the bars will not be of true cylindrical shape. In all cases, moreover, there is likely to be a burr along the meeting plane of the mold sections and, since this burr is on a cylindrical rather than a plane surface, it is removed only with difficulty.

Grinding bodies made by both methods above described are, therefore, not wholly satisfactory and before they will grind efficiently, they must be worn down in the mill until they lose as much as from 5% to 10% of their initial weight. During this operation of wearing the grinding bodies into proper condition, the mill operates at low efficiency and the conditioning of the grinding bodies thus represents a substantial item of expense.

The present invention is directed to a novel apparatus by which grinding bodies, such as those of cylindrical form with plane end surfaces, may be made in perfect shape and at a high output rate, the bodies produced by the practice of the invention having substantially their final efficiency at the time they are put into use.

In the production of such grinding bodies in accordance with the invention, bodies of molding material having flat surfaces are used, and in the flat surface of one of the bodies, a single or double row of cavities is formed, each of these cavities having the shape of a whole or complete grinding body to be cast. In the flat surface of the other body of material is formed a feed channel with which communicates a passage extending through the body of the material. To complete the mold, the bodies of molding material are placed with their flat surfaces contacting and with the feed channel in one surface communicating directly with the cavities through openings each of substantially less cross-sectional area than that of a cavity. This result may be accomplished by so disposing the bodies that the channel in one partially overlaps the cavities in the other. Molten metal is introduced into the passage and through the channel into the cavities and after the metal has set, the individual bodies are separated from the tongue of metal which has filled the channel. Since the channel overlaps the cavities only to a slight extent, the separation of the bodies from the metal tongue is a simple operation and only a slight burr is formed on each body and this can be readily removed, as in a cleaning drum. Since the entire mass of each body lies within a single body of molding material, inaccuracies arising from slight offsetting of mold sections are avoided and in consequence, grinding bodies made in accordance with a new method are, as formed, substantially of the final shape in which they have their greatest efficiency.

In the production of grinding bodies in accordance with the invention, the bodies are preferably cast in sand molds, but metal molds may be used if desired and, in the latter event, the grinding bodies are chill-cast.

For a better understanding of the invention, reference may be made to the accompanying drawings in which:

Fig. 1 is a vertical sectional view through a mold suitable for the practice of the invention, the mold being made up of a plurality of sections;

Fig. 2 is a plan view of one of the intermediate sections of the mold illustrated in Fig. 1;

Fig. 3 is a transverse sectional view on the line 3—3 of Fig. 2;

Fig. 4 is a transverse sectional view through an intermediate mold section;

Fig. 5 is an end view of the cast product before separation of the bodies from the inlet tongue;

Fig. 6 is a view similar to Fig. 1 of a mold of modified construction;

Fig. 7 is a cross-sectional view through the mold of Fig. 6;

Figs. 8 and 9 are views similar to Figs. 6 and 7, respectively, of a mold of another modified construction;

Fig. 10 is a sectional view on the line 10—10 of Fig. 9; and

Figs. 11 and 12 are views similar to Figs. 6 and 7, respectively, of a mold of a third modified construction.

Referring now to the drawings, one form of mold which may be used in the casting of bodies in accordance with the invention includes a box 10 of suitable material and a body of molding material 11. The body is formed with a flat upper surface 12 and a plurality of cavities 13 extend inward from the surface, each cavity having the shape of the grinding body to be produced. The cavities 13 may be arranged in any desired manner, but preferably lie in two rows with the cavities of one row staggered with respect to those of the other.

Resting on the box 10 is an intermediate mold section consisting of a box 14 containing a body of molding material 15. This body has flat upper and lower surfaces 16, 17 and the surface 17 lies in contact with the surface 12 of the body 11. A plurality of cavities 18 are formed in the body 15 to extend inward from the surface 16, and these cavities are preferably arranged, like the cavities 13, in two rows with the cavities in the rows staggered. Formed in the flat under surface 17 of the body 15 is a channel 19 which is preferably of trapezoidal cross section and so disposed that when the mold sections are assembled, as illustrated, the channel 19 lies between and slightly overlaps the cavities 13 in the body 11 and the remainder of each cavity is closed by the flat under surface 17 of the body 15. Also formed in the body 15 are vertical passages 20 extending through the body and leading to the channel 19.

Resting upon the box 13 is another intermediate mold section, generally designated 21, which is formed with flat upper and lower surfaces, cavities leading inward from the upper surface, a channel formed in the under surface, and a pair of passages leading through the body of molding material and communicating with the channel. A similar mold section 22 rests upon the section 21 and upon section 22 is the top section 23. This section consists of the usual box and a body of molding material 24 having a flat under surface 25 in which is formed a channel 26 communicating with passages 27 at its ends.

After the mold sections have been formed as described, they are placed one upon another to form the assembly illustrated in Fig. 1, and the sections are then held in this position by rods 28 passing through ears 29 extending outward from the ends of the sections. Hot metal is then introduced into the passages 27 in the top section and flows through the passages and channels into the cavities in the several sections. As will be seen in Fig. 3, each channel overlaps the cavities in the body of molding material in the section just below, and while the extent of overlap is slight, it is sufficient to permit metal to flow freely from the channels into the cavities. When the metal has set, the mold sections are taken apart and the cast product is then removed. At that point, the grinding bodies 30 will be found to be connected to an inlet tongue 31 formed in the channel by which the metal was supplied for the bodies. The connections, however, are very small so that the bodies can be easily separated from the tongue of metal connecting them. Also, the burr, which may be formed by the separation, lies on a plane surface of each body and can readily be removed.

The mold shown in Fig. 6 comprises a plurality of sections 32 each containing a body of molding material having a flat upper surface from which a plurality of cavities 33 lead inward. In the sections shown, the cavities are arranged in a single row and lying upon each section is a section 34 having a flat lower face from which leads upward a channel 35 narrower at the bottom than the cavities with which it communicates. Each section 32, except the bottom one, and each section 34 has one or more aligned passages 36 therethrough by which molten metal introduced into the channel 35 in the top section 34 can flow to the channels in lower sections 34. The metal flows from the channel in each section 34 into the cavities in the section 32 below it and, since each channel communicates with its associated cavities through openings of substantially less cross-sectional area than that of the cavities, the grinding bodies formed in the cavities can be readily separated from the tongues of metal formed in the channels without leaving substantial burrs on the bodies.

The mold shown in Figs. 8 to 10, inclusive, includes a lower blank section 37, a section 38 resting thereon and containing a channel 39 extending from face to face thereof, and a section 40 resting on section 38 and containing a plurality of grinding body cavities 41 arranged in two rows and extending inward from its lower face. Section 40 also contains a double row of similar cavities 41 extending inward from its upper face. Resting on section 40 is another section 38 containing a channel 39 and this arrangement of sections 38 and 40 may be repeated as desired. Each section 40 is provided with one or more passages 42 by which molten metal may flow from the channel 39 in one section 38 to the channel in the next lower section 38. Also sections 40 may be provided with appropriate vents to permit escape of trapped air from the cavities.

The mold shown in Figs. 11 and 12 includes a blank bottom section 43 and a section 44 resting thereon and similar to section 34, section 44 having a channel 45 therethrough. Resting on section 44 is a section 46 similar to section 40 and containing a double row of cavities 47 leading inward from each of its opposed flat faces. The channel 45 is of trapezoidal cross-section and section 44 is so positioned that the broader of the openings to the channel is opposed to the adjacent face of section 46 and the channel overlaps each of its associated cavities only to a small extent. Resting on section 46 is a section 44a containing a channel 45a and on section 44a is a section 48 which has a single row of cavities 49 extending inward from each of its opposed faces. Channel 45a in section 44a partially overlaps the cavities 47 in the upper face of section 46 below it and the narrower opening of the channel leads to the cavities 49. The arrangement of sections 44, 44a, 46 and 48 is repeated in the structure as desired and each of the sections is provided with one or more passages 50 by which metal introduced into the channel in the top section 44 can flow to the channels in the sections 44, 44a below the top. This metal enters the cavities to form the bodies, the cavities being appropriately vented where required.

In each of the molds illustrated, it will be observed that each cavity is filled through an opening of less cross-sectional area than that of the cavity so that separation of the body from the tongue of metal in the channel through which the cavity was filled is a simple operation and leaves only a small burr. Also, each such burr is on a flat surface of a grinding body and it is, therefore, easily removed.

I claim:

1. A mold for casting grinding bodies, which comprises a pair of cooperating mold sections each containing a body of molding material having a flat surface, the surfaces lying in contact, a feed channel located wholly in the surface of the body of material in one section, a cavity of the shape of the whole grinding body to be formed extending inward from the flat surface of the body of material in the second section and located wholly in the material of the second section, the channel communicating directly with the cavity through an opening of substantially less cross-sectional area than that of the cavity, and a passage in the body in the first section leading to the channel and communicating therewith only at one or more places spaced wholly away from said cavity in a direction longitudinally of the channel.

2. A mold for casting grinding bodies, which comprises a pair of cooperating mold sections lying one upon the other, each section containing a body of molding material, the bodies having flat surfaces lying in contact, a feed channel located wholly in the flat surface of the body in the upper section, a cavity of the shape of the whole grinding body to be formed extending inward from the flat surface of the body of material in the bottom section and located wholly in the material of the bottom section, the channel communicating directly with the cavity through an opening of substantially less cross-sectional area than that of the cavity, and a passage in the body in the upper section leading to the channel and communicating therewith only at one or more places spaced wholly away from said cavity in a direction longitudinally of the channel.

3. A mold for casting grinding bodies, which comprises a pair of cooperating mold sections, each containing a body of molding material and the bodies having flat surfaces lying in contact, a feed channel located wholly in the flat surface of one body, a row of cavities each of the shape of a whole grinding body to be formed extending inward from the flat surface of the second body and located wholly in the material of the second body, the channel communicating directly with each cavity through an opening of substantially less cross-sectional area than that of the cavity, and a passage in the body containing the channel and leading to the latter, and communicating therewith only at one or more places spaced wholly away from said cavities in a direction longitudinally of the channel.

4. A mold for casting grinding bodies which comprises at least three cooperating mold sections lying in a vertical column, each section containing a body of molding material, the contacting surfaces of the bodies in the sections being flat, a cavity of the shape of the grinding body to be formed extending inward from the flat surface of the body of material in the bottom section, a channel in the flat bottom surface of the body of material in the intermediate section, this channel partially overlapping the cavity in the body in the bottom section, a passage extending through the body in the intermediate section and communicating with the channel, a cavity of the shape of a grinding body to be formed extending inward from the flat upper surface of the intermediate section, a channel in the flat bottom surface of the stop section, the channel partially overlapping the cavity in the body in the intermediate section, and a passage through the body in the top section communicating with the passage in the intermediate section and with the channel in the top section.

5. A mold for casting grinding bodies, which comprises a mold section containing a body of molding material having opposed flat surfaces and a cavity of the shape of the grinding body extending inward from each surface, a pair of mold sections each containing a body of molding material having at least one flat surface and a channel leading inward from the surface, the first section lying between those of the pair with its flat surfaces in contact with those of the pair and the channels communicating with the cavities through openings each of substantially less cross-sectional area than that of the cavities, and aligned passages through the sections by which molten metal can be introduced into the channels and thence into the cavities.

6. A mold for casting grinding bodies, which comprises a mold section containing a body of molding material having opposed flat surfaces and a pair of cavities of the shape of a grinding body extending inward from each surface, a pair of mold sections each containing a body of molding material having at least one flat surface and a channel leading inward therefrom, the first section lying between those of the pair with the flat surfaces of the bodies of the sections in contact and each channel partially overlapping the pair of cavities in the adjacent face of the body in the intermediate section, and a passage through the sections communicating with the channels in the outer sections.

7. A mold for casting grinding bodies which comprises at least three co-operating mold sections lying in a vertical column, each section containing a body of molding material, the contacting surfaces of the bodies in the sections being flat, a cavity of the shape of the grinding body to be formed extending inward from the flat upper surface of the body of material in at least two of the sections, a feed channel for each cavity each of which extends inward from the flat bottom surface of the material in the section which is next higher than the one in which the cavity fed by that channel is located and lies wholly within such material, and each of said channels communicating with the cavity that is fed by it through an opening of substantially less cross-sectional area than that of the cavity, and passages in said sections communicating with said channels.

8. A mold for casting grinding bodies which comprises at least three co-operating mold sections lying in a vertical column, each section containing a body of molding material, the contacting surfaces of the bodies in the sections being flat, a row of cavities each of the shape of a grinding body to be formed extending inward from the flat upper surface of the body of material in at least two of the sections, a feed channel for each row of cavities each of which extends inward from the flat bottom surface of the material in the section which is next higher than the one in which the row of cavities fed by that channel is located and lies wholly within such material, and each of said channels communicating with the cavities that are fed by it through openings of substantially less cross-sectional area than that of the cavities, and passages in said sections communicating with said channels.

9. A mold for casting grinding bodies which comprises a mass of molding material enclosed laterally in separable mold sections arranged one above another in a stack, each section containing a body of said material removable therewith and said bodies together forming said mass, the mass containing groups of similar cavities in a plurality of levels, each cavity having the shape of an individual grinding body and extending inward from a bounding surface of one of said bodies of molding material in a mold section, the mass also containing horizontal channels in a plurality of levels, each channel lying wholly within a body of molding material and extending inward from at least one bounding surface of said body, which surface partly bounds the molding cavities in an adjacent section, said channels communicating with the cavities in at least one adjacent section through openings of less cross-sectional area than that of a cavity, vertical passages being formed in the mass to connect the channels in different levels.

10. In a mold for casting grinding bodies, the combination of a pair of cooperating mold sections each containing a body of molding material having a flat surface, the sections lying with said surfaces in contact, one section having a row of cavities each of the shape of a complete grinding body extending inward from said surface into the body of molding material in said section, the second section being formed with conducting means for molten metal to be introduced into said cavities, said means lying wholly within the body of molding material in said second section and including a channel portion of greater length than said row of cavities extending along said row and communicating with each cavity through an opening of less cross-sectional area than that of the cavity and also including at least a portion which extends entirely through the body of molding material in said section and communicates with a portion of the channel lying beyond the end of the row of cavities.

11. In a mold for casting grinding bodies, the combination of a pair of cooperating mold sections each containing a body of molding material having a flat surface, the sections lying with said surfaces in contact, one section having a row of cavities each of the shape of a complete grinding body extending inward from said surface into the body of molding material in said section, the second section being formed with conducting means for molten metal to be introduced into said cavities, said means lying wholly within the body of molding material in said second section and including a channel of greater length than said row of cavities extending along said row and communicating with each cavity through an opening of less cross-sectional area than that of the cavity and also including at least a portion which extends entirely through the body of molding material in said section and communicates with a portion of the channel lying beyond the end of the row of cavities, and a passage extending entirely through the body of molding material in said first section and communicating with said conducting means therein.

12. A mold for casting grinding bodies which comprises a mold section containing a body of molding material having a flat lower surface, a channel extending inward from said surface and lying wholly within the body of molding material in said section, a second mold section below the first containing a body of molding material having flat upper and lower surfaces, the upper surface lying in contact with the lower surface of the first section and containing a plurality of cavities extending inward from said upper surface, each cavity having the form of a complete grinding body and communicating with said channel through an opening of less cross-sectional area than said cavity, a passage through the body of molding material in said second section leading from said channel, a channel formed in the lower surface of said second section and communicating with said passage, and a third mold section lying below the second section and containing a body of molding material having a flat upper surface in contact with the lower surface of the second section, the body of molding material in said third section being provided with a plurality of cavities leading inward from the flat upper surface thereof, each cavity having the shape of a complete grinding body and communicating with the channel in the second section through an opening of less cross-sectional size than said cavity.

13. A mold for casting grinding bodies which comprises a plurality of mold sections arranged one above the other in a stack, the mold sections each containing a body of molding material and said bodies in adjacent sections having flat surfaces in contact, the lowermost section having a solid body of molding material and alternate sections starting with the section next above the bottom having lengthwise channels therethrough connecting the opposite faces thereof, the intermediate sections having cavities formed in the opposite faces thereof, each cavity having the shape of a complete grinding body and communicating with the channel in the adjacent section through an opening of less cross-sectional area than that of the cavity, said sections containing the cavities having passages therethrough connecting the channels in sections on either side thereof.

NIELS MARIUS HANSEN.